(12) United States Patent
Bachmann et al.

(10) Patent No.: US 11,527,841 B2
(45) Date of Patent: Dec. 13, 2022

(54) ELECTRICAL CONNECTION SYSTEM FOR CONNECTING A PRINTED CIRCUIT BOARD TO A PLUG CONNECTOR BY WAY OF AN ELECTICAL CONNECTION DEVICE

(71) Applicant: WEBASTO SE, Stockdorf (DE)

(72) Inventors: Harald Bachmann, Stockdorf (DE); Marco Walther, Stockdorf (DE); Andreas Janker, Stockdorf (DE); Carsten Siebold, Stockdorf (DE); Rene Landmann, Stockdorf (DE); Hans Rechberger, Stockdorf (DE)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 17/072,552

(22) Filed: Oct. 16, 2020

(65) Prior Publication Data
US 2022/0123484 A1 Apr. 21, 2022
US 2022/0368042 A9 Nov. 17, 2022

(30) Foreign Application Priority Data

Oct. 18, 2019 (DE) .......................... 102019128179.2

(51) Int. Cl.
*H01R 12/52* (2011.01)
*H01R 13/11* (2006.01)
(Continued)

(52) U.S. Cl.
CPC ............. *H01R 12/52* (2013.01); *H01R 13/11* (2013.01); *H01R 13/40* (2013.01); *H01R 13/629* (2013.01);
(Continued)

(58) Field of Classification Search
CPC ........ H01R 12/52; H01R 13/11; H01R 13/40; H01R 13/629; H01R 12/50; H01R 12/51; H01R 2201/26
See application file for complete search history.

(56) References Cited

U.S. PATENT DOCUMENTS 6,328,600 B1   12/2001  Fujiki et al.
11,114,806 B2 * 9/2021  Zushi ..................... H01R 24/42
(Continued)

FOREIGN PATENT DOCUMENTS

CN        1310494 A    8/2001
CN      205863473 U    1/2017
(Continued)

*Primary Examiner* — Abdullah A Riyami
*Assistant Examiner* — Justin M Kratt
(74) *Attorney, Agent, or Firm* — Quarles & Brady LLP

(57) ABSTRACT

An electrical connection device for connecting a plug, preferably a HV pin header, to a printed circuit board in a motor vehicle, having the following: at least one first electrical connection-device for contacting at least one assigned plug-connector contact; at least one second electrical connection-device contact for contacting at least one assigned printed-circuit-board contact wherein at least one first connection-device contact at least one second connection-device contact are connected to one another, wherein the electrical connection device is configured in such a manner that at least one printed-circuit-board contact is able to be selectively connected to assigned plug-connector contacts which differ in terms of the relative disposal thereof in relation to the printed-circuit-board contact and/or differ from one another in that said plug-connector contacts are a component part of plug connectors which differ from one another in terms of the configuration of the respective plug-connector contacts thereof.

13 Claims, 3 Drawing Sheets

(51) Int. Cl.
*H01R 13/40* (2006.01)
*H01R 13/629* (2006.01)
H01R 12/50 (2011.01)
H01R 12/51 (2011.01)

(52) U.S. Cl.
CPC .............. *H01R 12/50* (2013.01); *H01R 12/51* (2013.01); *H01R 2201/26* (2013.01)

(56) References Cited

U.S. PATENT DOCUMENTS

2004/0209495 A1* 10/2004 Kennedy ................ H05K 3/366
439/78
2005/0215089 A1 9/2005 Grundy

FOREIGN PATENT DOCUMENTS

| | | | |
|---|---|---|---|
| CN | 206893893 U | 1/2018 | |
| CN | 109428244 A | 3/2019 | |
| CN | 109638528 A | 4/2019 | |
| DE | 10310558 A1 | 10/2003 | |
| DE | 102006027014 A1 | 12/2007 | |
| DE | 102013103446 A1 * | 10/2014 | ......... H01R 13/6272 |
| DE | 102013103446 A1 | 10/2014 | |

\* cited by examiner

# ELECTRICAL CONNECTION SYSTEM FOR CONNECTING A PRINTED CIRCUIT BOARD TO A PLUG CONNECTOR BY WAY OF AN ELECTICAL CONNECTION DEVICE

CROSS-REFERENCE TO RELATED APPLICATIONS

This application claims priority to German Patent Application No. 102019128179.2 filed Oct. 18, 2019, the contents of which are incorporated herein by reference.

DESCRIPTION

The disclosure relates to an electrical connection installation for connecting a plug connector to a printed circuit board, to a system comprising an electrical connection installation as well as at least one printed circuit board and/or at least one plug connector, as well as to a corresponding connection method for electrically connecting a plug connector to a printed circuit board by means of a connection device.

Plug connectors (pin headers) by way of which contacts of a (printed circuit) board can be connected to further electrical components or lines, respectively, are known in the prior art. In order to in turn enable a connection between the pin header and the printed circuit board, the latter can be equipped with corresponding components.

However, the solutions known in the prior art are considered to be comparatively laborious, in particular inflexible, in terms of the application.

It is therefore an object of the present disclosure to propose an electrical connection device which facilitates the handling when establishing an electrical connection between a printed circuit board and a plug connector (pin header). A flexible response in terms of various parameters (such as, in particular, installation space conditions and/or plug connected geometries) is in particular to be possible. It is furthermore an object of the disclosure to propose a corresponding system comprising a connection device of this type as well as a plug connector and/or a printed circuit board, and a corresponding method for establishing an electrical connection.

The object is in particular achieved by a connection device as claimed in claim 1.

The object is in particular achieved by an electrical connection device for connecting a plug connector, in particular a pin header, preferably a high-voltage (HV) pin header, to a printed circuit board (PCB), preferably in (or for, respectively) a motor vehicle, said electrical connection device having the following:

a first number of at least one first (proximal to the plug connector, or assigned to the plug connector, respectively) electrical connection-device contact (preferably in the form of at least one first connection-device contact receptacle) for contacting at least one assigned plug-connector contact (preferably a plug connector pin); and a second number of at least one second (proximal to the printed circuit board, or assigned to the printed circuit board, respectively) electrical connection-device contact (preferably a connection-device contact pin) for contacting at least one assigned printed-circuit-board contact (preferably at least one printed-circuit-board contact receptacle).

At least one first connection-device contact and at least one second connection-device contact (within the connection device or by the latter, respectively) are preferably connected to one another (by way of at least one corresponding electrical connection, in particular line), wherein the electrical connection device is in particular configured in such a manner that at least one printed-circuit-board contact is able to be selectively connected to assigned plug-connector contacts which differ in terms of the relative disposal thereof (in particular in terms of corresponding relative contacting direction, in particular a relative mutual introduction direction) in relation to the printed-circuit-board contact, and/or differ in that said plug-connector contacts are a component part of plug connectors which differ from one another in terms of the configuration (in particular the disposal and/or moulding) of the respective plug-connector contacts thereof.

A first concept of the disclosure lies in configuring a connection device such that a flexible relative disposal between the plug connector (pin header) and the printed circuit board is enabled, in particular in that there are at least two alternatives for a contacting direction (introduction direction) of the plug connector in relation to the printed circuit board.

Alternatively or additionally, the concept of the disclosure lies in proposing a connection device which is configured such that different plug connectors (which differ from one another in terms of the configuration of the respective plug-connector contacts thereof) are able to be used with the same connection device (and thus with the same printed circuit board).

The connection device is preferably configured such that said connection device in the state connected to the connection plug and/or the printed circuit board is able to be released (in a non-destructive manner) from the connection plug or the printed circuit board, respectively (optionally without tools or by means of tools).

A plug connector is in particular to be understood to be an installation which is connected to an (external) line or is able to be connected to such a line (such that the printed circuit board by way of the line can ultimately be connected to an external installation, or an electrical functional group, respectively. The plug connector is preferably configured as a pin header. The pin header is in particular understood to be a plug connector having a plurality of pin contacts (which are in particular disposed in-line). A plurality (or all) of the pin contacts of the pin header are preferably able to be brought into electrical contact with the connection device (in particular by being introduced into corresponding receptacles of the connection device). The pin header is preferably a high-voltage pin header (HV pin header). The plug connector (in particular the pin header) can have at least one high-voltage contact and/or at least one low-voltage contact. In this context, the delimitation between a low-voltage and a high-voltage is to be at 60 V. Voltages (or correspondingly configured contacts, respectively) which are below said limit are considered to be low voltages. Voltages which are of this value or above are considered to be high voltages.

The connection device and/or the printed circuit board preferably also have corresponding high-voltage and/or low-voltage contacts.

The first number can be (at least) 1, at least 2, or at least 4.

The second number can be (at least) 1, or at least 2, or at least 4, or at least 8.

A connection is presently understood to always be an electrical connection (either an indirect or a direct connection), unless the respective context suggests otherwise.

At least one or a plurality or all of the first electrical connection-device contacts is/are a (respective) connection-device contact receptacle. Alternatively, this here can also be (at least) one contact pin. It is also conceivable for at least one first electrical connection-device contact to be configured as a pin and for at least one first electrical connection-device contact to be configured as a receptacle (coupling).

At least one, in particular a plurality, or all, of the second electrical connection-device contacts is/are preferably present as a contact pin. Alternatively, at least one (optionally a plurality or all) of the second electrical connection-device contacts can be present as a receptacle (coupling). It is possible that at least one of a plurality of second electrical connection-device contacts is present as a receptacle (contact receptacle) and at least one of a plurality of second electrical connection-device contacts is present as a pin.

A selective connection (contacting) of assigned plug-connector contacts is in particular to be understood that either a first plug-connector contact is able to be connected to a (specific) printed-circuit-board contact which differs from a deviating (second) plug-connector contact, or the deviating (second) plug-connector contact is able to be connected to the (specific) printed-circuit-board contact.

The first plug-connector contact and the second plug-connector contact can be the same plug-connector contact (potentially also of the same plug connector), wherein a first plug-connector contact and second plug-connector contact are potentially able to be differentiated only by a dissimilar relative disposal. However, these can also be plug-connector contacts of different designs, or at least be plug-connector contacts which are a component part of plug connectors of different designs.

A selective connection between a printed-circuit-board contact and a plug-connector contact is not intended to mandatorily preclude that a plurality of the plug-connector contacts which are assigned to a specific printed-circuit-board contact are simultaneously connected to the electrical connection installation, for example. This can however be precluded, in particular in the context that in the case of a specific disposal (for example in a specifically assembled system) only one connection (of a plurality of potentially possible connections) is implemented between a corresponding printed-circuit-board contact and an assigned plug-connector contact. For example, when two first connection-device contacts are connected to one another by way of the same second connection-device contact (within the connection device), the connection device is to be correspondingly configured that in the specific establishment of the electrical connection between the printed circuit board and the plug connector only one, or a sub-group, of the plurality of first connection-device contacts is utilized (or is designated, respectively). The remaining connection-device contact, or the remaining connection-device contacts, in this instance preferably remains/remain vacant.

A relative disposal between the plug-connector contact and the printed-circuit-board contact is in particular understood to be the spatial positioning and/or orientation of said contacts relative to one another (specifically in a state in which the plug-connector contact and the printed-circuit-board contact are connected to a corresponding connection-device contact such that the printed-circuit-board contact and the plug-connector contact in turn are connected to one another by way of the electrical connection device).

To the extent that the contacts are configured as high-voltage contacts, said contacts are preferably suitable for currents up to at least 1 A or more, preferably at least 10 A or more, furthermore preferably at least 40 A or more, and/or for voltages of up to 100 V or more, preferably up to 400 V or more, furthermore preferably up to 1000 V or more. To the extent that a contact is conceived as a low-voltage contact (in particular in terms of the structure and/or disposal thereof, in particular in relation to further contacts), said low-voltage contact can preferably be conceived for currents up to at most 10 A or less, or at most 1 A or less, and/or at most 400 V or less, or at most 100 V or less.

The electrical connection device is preferably formed as an integral functional group which in particular has an insulation body as main body. The insulation body (main body) can account for at least 10% by weight, optionally at least 20% by weight, of the electrical connection device, and/or be formed from an electrically insulating material.

According to the disclosure a flexible electrical connection possibility which for electrically connecting a printed circuit board (in particular in a motor vehicle) is adaptable in a simple manner to environmental conditions or other parameters is achieved. In particular, comparatively flexible (universal) contacting is enabled for different plug connectors (HV pin headers).

Different plug-fitting directions are preferably possible. Comparatively high currents and voltages can also particular preferably be present. (Fully automatic) mounting on the printed circuit board and a (fully automatic) final assembly of a plug connector (HV pin header) to an ECU (electronic control unit) is in particular also possible.

The connection-device contacts (or at least one or a plurality thereof) can preferably also be used as single contacts.

A modular electrical connection system (contact system) can particularly preferably enable different high-voltage pin headers to be attached to the printed circuit board (PCB) while using standard high-current (or high-voltage, respectively) contacts.

The respective contact (of the connection device and/or of the printed circuit board and/or of the plug connector) is preferably disposed so as to be stationary (thus in particular in relation to a main body of the respective element, thus in particular the connection device or the printed circuit board or the plug connector, respectively), so as to be immovable. Alternatively however, this can be possible.

The connection device can be configured as an inherently rigid body, thus in particular without any movable components (optionally with the exception of springs for contacting).

The second number preferably comprises at least two second connection-device contacts which are configured in such a manner that the same (stationary) printed-circuit-board contact is able to be selectively connected to the at least two second connection-device contacts (thus either to one of the at least two second connection-device contacts or to at least one further of the two second connection-device contacts) in a first alignment and in at least one further alignment, in particular at least substantially orthogonal to the first alignment, of the connection device in relation to the printed circuit board. At least substantially orthogonal here and hereunder is to be understood that the respective angle is at least 60°, preferably at least 80°, furthermore preferably at least 85°, and/or at most 120°, preferably at most 100°, furthermore preferably at most 95°. An alignment (or a variation of the latter, respectively) preferably corresponds to a spatial rotation (or a rotary position, respectively) of the respective installation, or of the respective element (for example of the plug connector), respectively, in relation to the respective other element, or the respective other installation (for example the printed circuit board), respectively. An orthogonal alignment in this instance means an alignment in which the one element (or the one installation, respectively), for example the printed circuit board, is not rotated in space and the second element (or the second installation, respectively), for example the plug connector, is spatially rotated about an angle of at least substantially 90°, for example.

Alternatively or additionally, the first number can comprise at least two first connection-device contacts which are configured in such a manner that the same (stationary) plug-connector contact is able to be selectively connected to the at least two first connection-device contacts in a first and in at least one further alignment, in particular substantially orthogonal to the first alignment, of the connection device in relation to the plug connector.

The first number in embodiments comprises at least two first connection-device contacts which are preferably disposed at different locations (positions) of the connection device and are connected (or able to be connected) to the same second connection-device contact. The different positions are preferably mutually separated by at least 2 mm, preferably at least 4 mm, and/or are mutually electrically insulated by an insulating portion, in particular of the insulation body.

The connection between the two first connection-device contacts and the (same) first connection-device contact preferably takes place by way of corresponding lines which run in the connection device. The corresponding devices can be present so as to be parallel (in terms of the circuitry) at least (or only) in portions. Alternatively or additionally, there can be a circuitry which when required establishes the required connection between the respective first connection-device contact and the second connection-device contact.

Alternatively or additionally, the second number can comprise at least two second connection-device contacts which are disposed at different locations (positions) of the connection device and are connected, or able to be connected, to the same first connection-device contact (the latter for example by way of corresponding circuits). The flexibility of the electrical connection device can be improved in a simple manner on account thereof.

The first number can comprise at least two dissimilar contact types which preferably differ in terms of the voltage ranges thereof, in particular a first contact type (=HV contact) for a high voltage and a second contact type (=LV contact) for a low voltage. Alternatively or additionally, the first number can comprise at least two dissimilar contact types which differ in terms of the (connector) geometry thereof.

The second number can comprise at least two dissimilar contact types which preferably differ in terms of the voltage ranges thereof, in particular a first contact type (=HV contact) for a high-voltage and a second contact type (=LV contact) for a low voltage. Alternatively or additionally, the second number can comprise at least two dissimilar contact types which differ in terms of the geometry thereof.

On account thereof, a flexible electrical connection can be enabled in association with a minor complexity in terms of construction.

The connection device preferably has at least one (or exactly one) insulation body. The (respective) connection-device contact is preferably attached to the insulation body and/or is (at least partially) embedded in the insulation body (thus preferably runs at least in portions within the insulation body). Electrical connections (lines) which connect at least one first connection-device contact to at least one second connection-device contact preferably run in portions or completely within the insulation body (this may relate to electrical connections for the respective LV contacts, for example) and/or run in portions (or completely) on the insulation body (this may relate to electrical connections for the respective HV contacts, for example).

Connection-device contacts, in particular connection device HV contacts, which are in each case connected to one another are preferably connected to one another by way of an attached conductive body (for example on the insulation body).

The above-mentioned object is furthermore achieved by a system, in particular an assembly, comprising an electrical connection device of the above type, as well as at least one printed circuit board and/or at least one plug connector which are/is able to be connected, or are/is connected, to the connection device. The at least one printed circuit board and the at least one plug connector are preferably able to be connected, or are connected, (in a conducting manner) by way of the connection device. At least one plug connector is preferably able to be connected (or in one of the at least two different configurations is actually connected, respectively) to the connection device at at least two different locations (positions) and/or in at least two different relative alignments in relation to the printed circuit board.

The system is preferably configured as a set and comprises at least two plug connectors which differ from one another in terms of the disposal and/or moulding and/or a number of the respective plug-connector contacts thereof.

The connection device is preferably able to be connected to the connection device in (at least) two different relative alignments in relation to the printed circuit board (which is in particular connected to the connection device).

In one embodiment of the system or of the assembly, respectively, a housing in which the printed circuit board and/or the connection device are/is preferably able to be at least partially, in particular completely, received, and/or into which at least one plug-connector contact is able to be introduced, or is introduced, optionally from two different directions, preferably directions which are at least substantially mutually orthogonally, is provided. The printed circuit board and/or the connection device are/is preferably disposed in the housing by way of at least 50% by weight or at least 90% by weight. The plug connector (in the assembled state in which an electrical connection is implemented) is preferably disposed outside the housing by way of at least 50% by weight, optionally at least 80% by weight. The housing preferably has at least one clearance (opening) through which the plug connector in portions (in particular at least one plug-connector contact) is able to be introduced into the housing. In one specific embodiment the housing has (exactly) one, optionally also more, for example (at least) two (or exactly two) clearances (openings) which can optionally be disposed on different walls (which are in particular at an angle to one another, optionally at an at least substantially right angle to one another). A protected installation of the printed circuit board, or of the connection system, respectively, can be enabled in a simple manner on account thereof, wherein there is furthermore a high degree of flexibility.

The plug connector can have at least one plug-connector contact for connecting at least one (external) electrical line (which in turn can be connected, or be able to be connected, to an external electrical functional group).

The above-mentioned object is furthermore achieved by an (electrical) connection method for connecting a plug connector, in particular a pin header, preferably a HV pin header, to a printed circuit board, preferably while using the system of the above type, in particular in a motor vehicle, wherein the plug connector and the printed circuit board are electrically connected to one another by means of a connection device of the above type.

In a specific implementation of the method, the printed circuit board can first be moved to the location of (final) assembly or already be disposed there. In a subsequent step, the electrical connection device can be (electrically) connected to the printed circuit board. After this step (or alternatively prior to this step), the plug connector (pin header), optionally after said plug connector has been fastened to the housing, can be connected to the connection device.

In one design embodiment of the method the printed circuit board, optionally having the connection device already connected to the printed circuit board, can first be disposed in a housing, and the plug connector for establishing the electrical connection to the printed circuit board can thereafter be introduced in portions into the housing (through the corresponding clearance, in particular opening).

In the electrical connection method, there can in particular be two possible relative disposals (which are in particular able to be implemented) for the plug connector in relation to the printed circuit board, wherein one of the two possible relative disposals is selected. Alternatively or additionally, there can be two plug connectors which are able to be connected to the connection device and which are configured so as to be dissimilar in terms of the respective plug-connector contacts thereof, wherein one of said plug connectors is selected and connected to the connection device.

The above-mentioned object is in particular furthermore achieved by a motor vehicle comprising the above electrical connection device, in particular comprising the above system.

The above-mentioned object is in particular furthermore achieved by a unit comprising an (electronic) control unit (ECU) as well as the above system.

Further embodiments are derived from the dependent claims.

The disclosure will be described hereunder by means of an exemplary embodiment which will be explained in more detail by means of the images in which.

The same reference signs are used for identical and functionally equivalent parts in the description hereunder.

Figure 1:
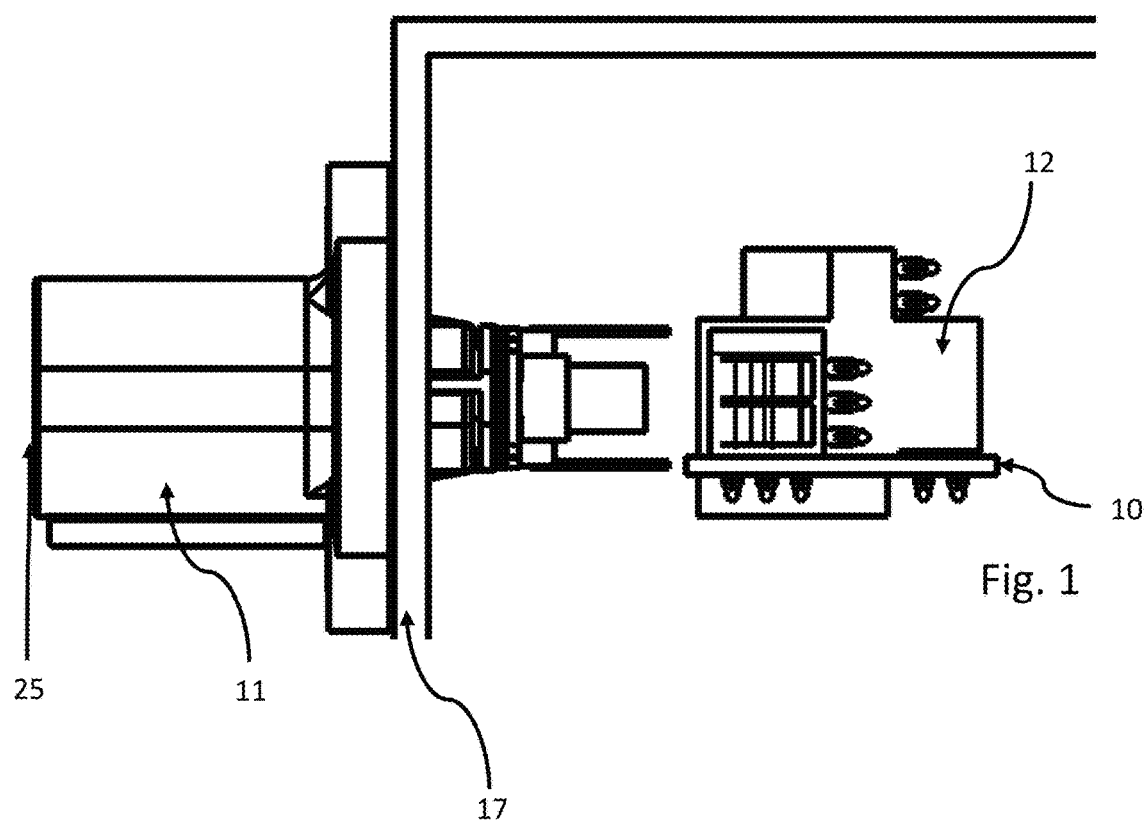
FIG. 1 shows a schematic illustration of a system according to the disclosure in a lateral view.
Figure 2:
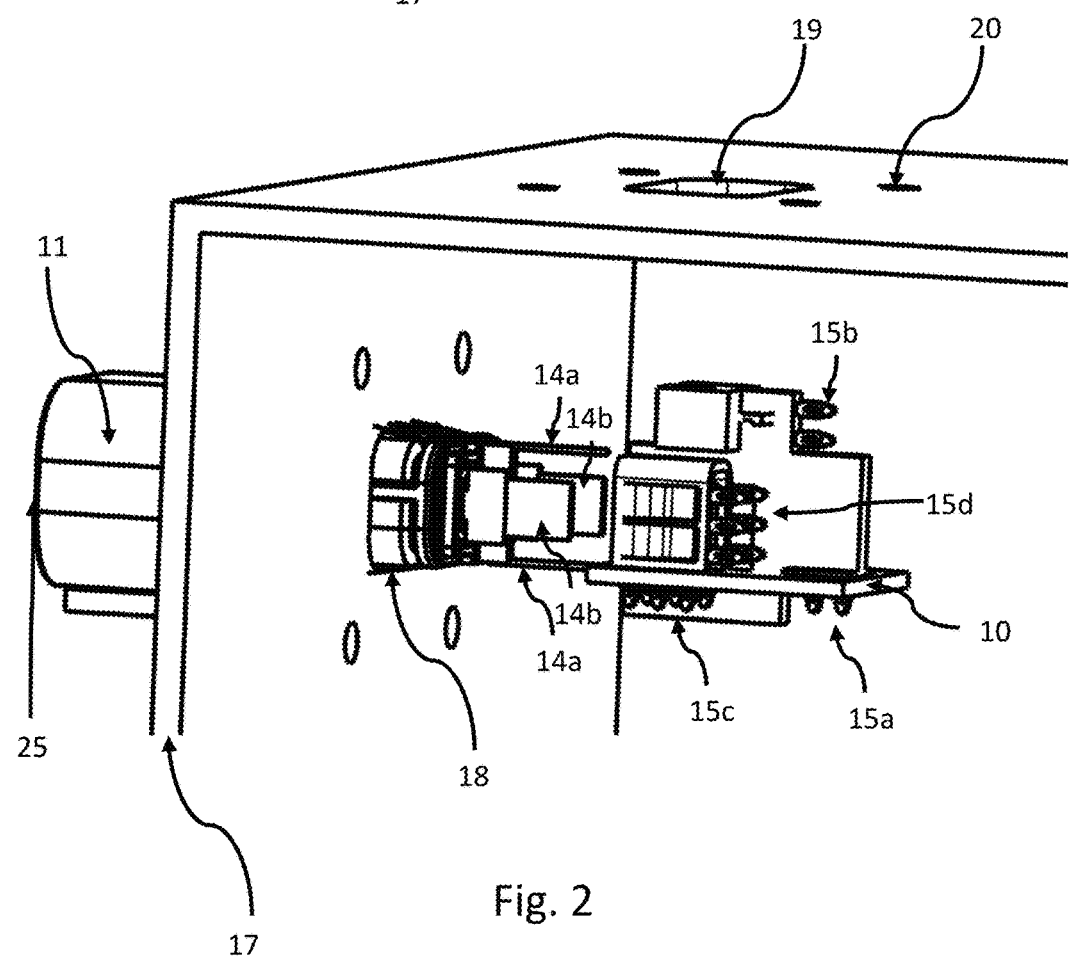
FIG. 2 shows the system according to FIG. 1 in an oblique view.
Figure 3:
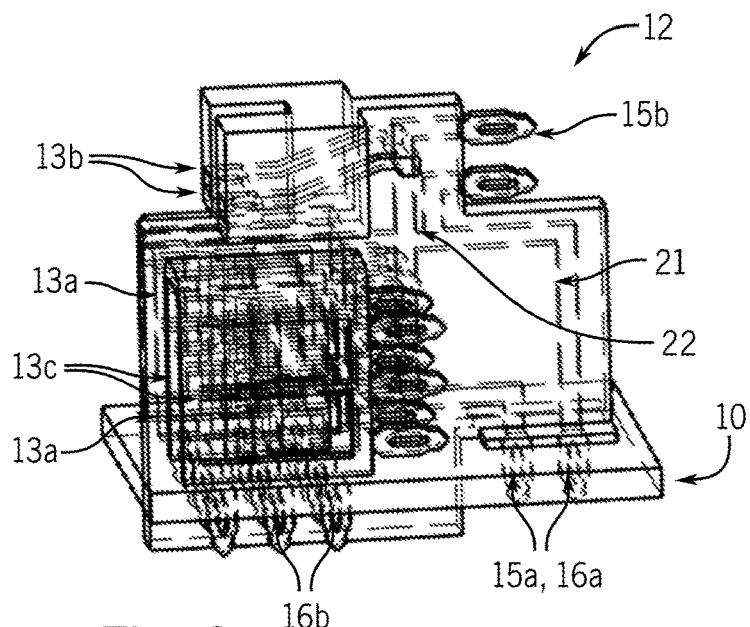
FIG. 3 shows a connection device according to the disclosure having a printed circuit board in a schematic oblique illustration and with the partial illustration of lines running in the interior.
Figure 4:
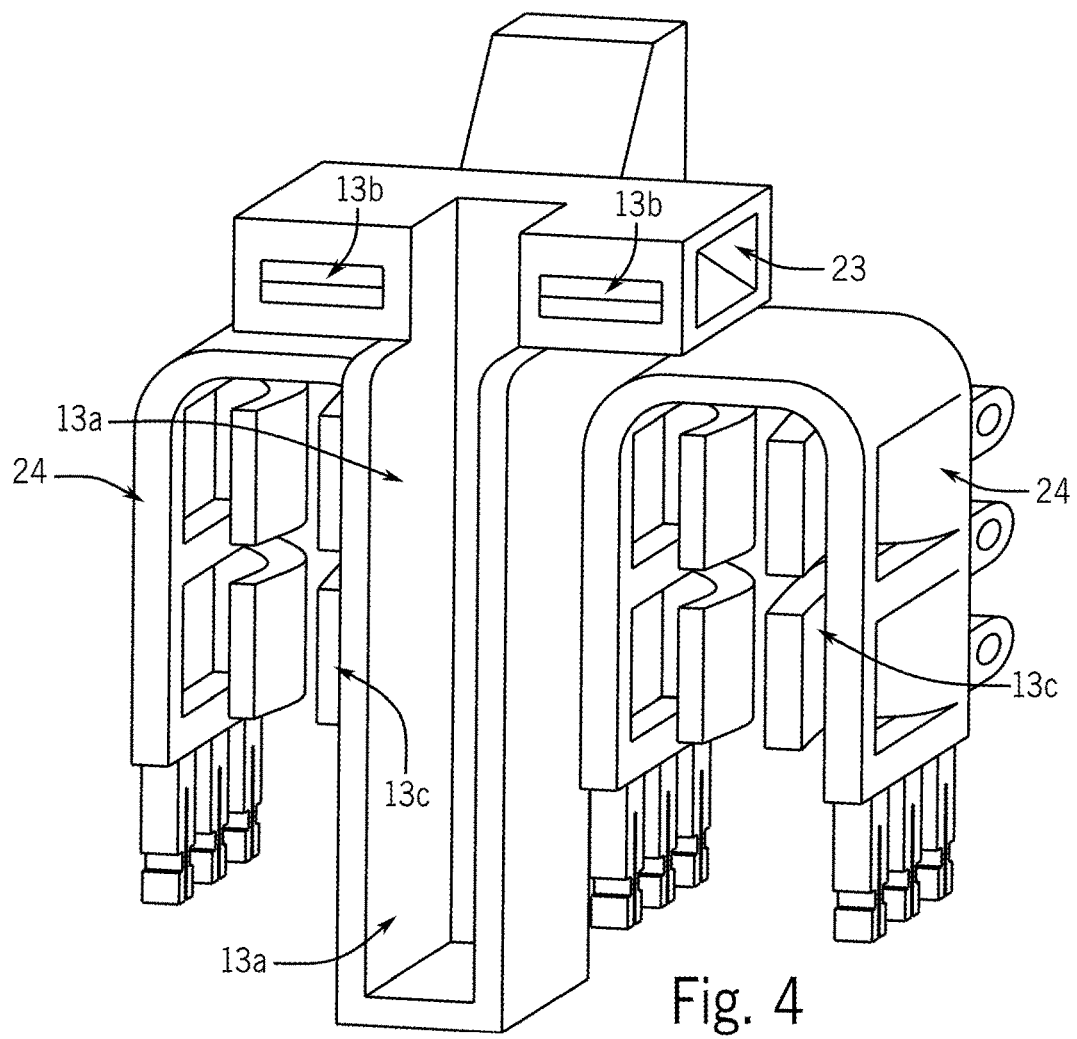
FIG. 4 shows a connection device according to the disclosure in an oblique view.

FIG. 1 shows an electrical system comprising a printed circuit board 10, a plug connector (for example a HV pin header) 11, and connection device 12 for connecting the printed circuit board 10 and the plug connector 11. An oblique view of the same system (or of the same assembly, respectively) is shown in FIG. 2. An oblique view having a partially visible profile of internal lines of the connection device 12 as well as of the printed circuit board 10 is illustrated in FIG. 3. An oblique view of the connection device 12 is illustrated in FIG. 4. It can also be seen therein that the connection device 12 comprises an insulation body 23 and (for example two) conducting bodies 24.

As can be seen in FIG. 3, the connection device 12 comprises first (electrical) connection-device contacts 13a, 13b, and 13c (see also FIGS. 1, 2, and 4). The first connection-device contacts 13a, 13b, and 13c are preferably configured as contact receptacles (couplings).

The first connection-device contacts 13a are preferably configured as LV contacts so that corresponding plug connector LV contacts of a specific plug connector are able to be connected. The first connection-device contacts 13b are preferably likewise LV contacts which are connected, or able to be connected, respectively, to corresponding plug connector (LV) contacts.

The first connection-device contacts 13c are preferably HV contacts which are connected, or able to be connected, respectively, to corresponding plug connector (HV) contacts.

The connection-device contacts 13a and 13b preferably differ in that different plug connectors (which preferably differ from one another in terms of the corresponding LV contacts thereof) can be (electrically) connected to the connection device, or to the corresponding connection-device contacts, respectively.

Specifically, the first connection-device contacts 13a and the first connection-device contacts 13b preferably differ from one another in that the connecting line among the connection-device contacts 13a and the connecting line among the connection-device contacts 13b (in terms of the respective geometric centres of said contacts) are mutually (at least substantially) perpendicular (in general terms form an angle of ≥30°).

The plug connector 11 (see FIGS. 1 and 2) correspondingly has plug-connector contacts 14a, 14b, wherein the plug-connector contacts 14a, 14b according to the embodiment are configured as protrusions (pins). The plug-connector contacts 14a are preferably configured for contacting the first connection-device contacts 13a. The plug-connector contacts 14b are preferably configured for connecting (contacting) the connection-device contacts 13c and are correspondingly configured.

The connection device 11 furthermore has second connection-device contacts 15a, 15b, 15c, and 15d. All of the second connection-device contacts 15a to 15d are preferably configured as protrusions (pins). Specifically, at least four, optionally at least six, second connection-device contacts 15c and/or at least four or at least six second connection-device contacts 15b can be provided, for example. Furthermore, at least two connection-device contacts 15a and/or at least two connection-device contacts 15b can be provided.

In functional terms, the connection-device contacts 15a, 15b are mutually redundant because said connection-device contacts 15a, 15b enable in each case corresponding printed-circuit-board contacts to be contacted. Either the connection-device contacts 15a or the connection-device contacts 15b thus possibly remain unutilized in a corresponding (completed) assembly (these in FIG. 2 being the connection-device contacts 15b).

Accordingly, the second connection-device contacts 15c, 15d are redundant in functional terms. In other words, either the connection-device contacts 15c or the connection-device contacts 15d (in the completed assembly) remain unutilized (these in FIG. 2 being the connection-device contacts 15d).

The connection-device contacts 15a, 15b, are preferably LV contacts.

The connection-device contacts 15c, 15d are preferably HV contacts.

As can be seen from FIGS. 1 and 2, a connecting direction (contacting direction) assigned to the connection-device contacts 15a deviates from a corresponding connecting direction (contacting direction) of the connection-device contacts 15b by 90°. Accordingly, a connecting direction of the connection-device contacts 15c differs from a connecting direction (contacting direction) of the connection-device contacts 15b by 90°.

Figure 5:
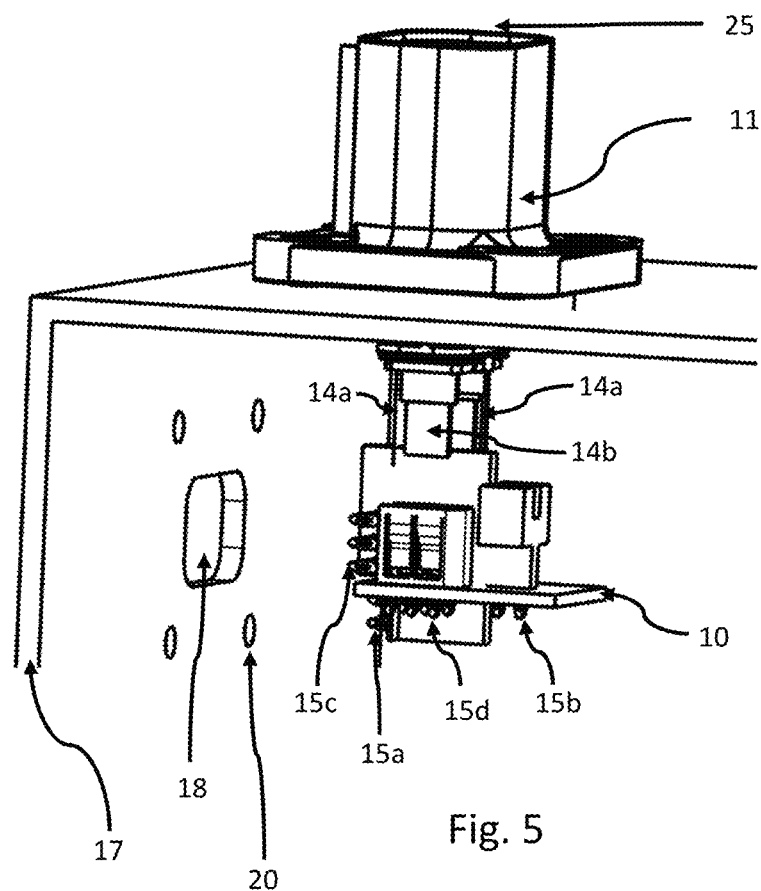
FIG. 5 shows the system according to FIGS. 1 and 2 in a deviating configuration.

It is enabled on account thereof that the connection device 12 is disposed so as to be rotated by 90° in relation to the printed circuit board 10, as can be seen in FIG. 5.

The printed circuit board has corresponding printed-circuit-board contacts 16a, 16b (preferably configured as receptacles or couplings, respectively). The printed-circuit-board contacts 16a are preferably LV contacts. The printed-circuit-board contacts 16b are preferably HV contacts.

The printed-circuit-board contacts 16a are preferably connected (either) to the connection-device contacts 15a or to the connection-device contacts 15b. The printed-circuit-board contacts 16b are preferably connected either to the connection-device contacts 15c or to the connection-device contacts 15d.

Figure 6:
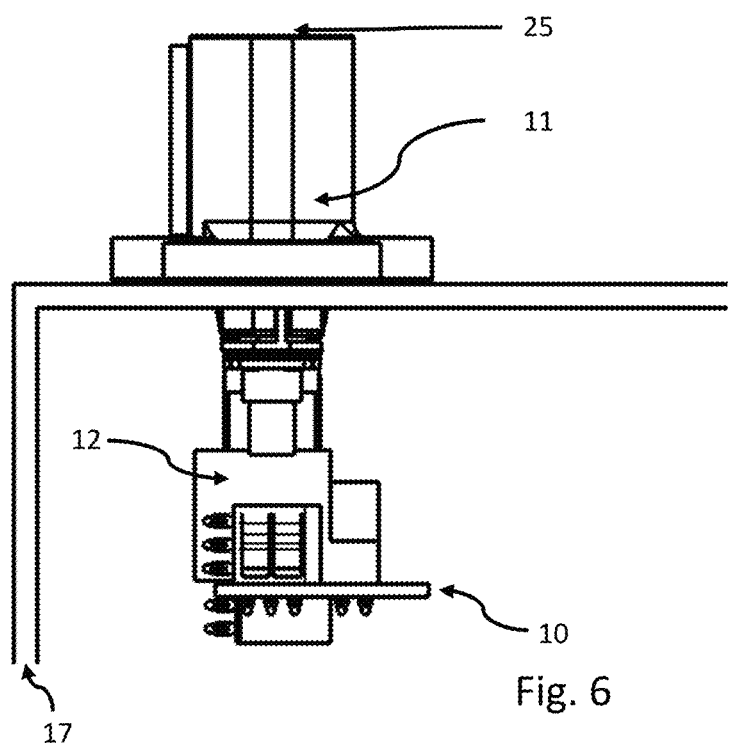
FIG. 6 shows the configuration according to FIG. 5 in a lateral view.

Furthermore to be seen in FIGS. 1 and 2 is a housing 17 in which the printed circuit board 10 and the connection device 12 are received. The plug connector 11 can be partially introduced through a corresponding first opening 18 so that a connection to the connection device 12 and thus to the printed circuit board 10 can be enabled. An alternative embodiment of the housing 17 comprises a second opening 19 instead of the first opening 18, a plug connector (in particular that shown in FIGS. 1 and 2) being able to be likewise introduced through said second opening 19, as is illustrated in FIGS. 5 and 6. On account thereof, an introduction direction, or contacting direction, respectively, for the plug connector 11 that deviates by 90° can be enabled in a simple manner (while the disposal of the printed circuit board 10 in relation to the housing 17 remains the same). The plug connector 11 can be fastened or fixed, respectively, to the housing 17 by way of fastening installations 20 (preferably configured as cutouts, for example as threads).

Overall, the contacts to be connected are connected by way of lines 21 which run within the connection device and which correspondingly diverge or converge at branches 22 so as to be able to be selectively utilize the functionally associated contacts (for example the connection-device contacts 15a or 15b in FIG. 3) in order for the electrical connection to be established.

The plug connector 11 can have at least one external plug-connector contact 25 (configured as a contact receptacle, for example) by way of which at least one (external, not illustrated in the figures) line (for example a cable) can be connectable.

At this point it should be noted that all the parts described above, viewed independently or in any combination, in particular the details illustrated in the drawings, are claimed as independent refinements of the i disclosure. Modifications thereof are possible.

LIST OF REFERENCE SIGNS

10 Printed circuit board
11 Plug connector
12 Connection device
13a-13c First connection-device contacts
14a, 14b Plug-connector contacts
15a-15d Second connection-device contacts
16a, 16b Printed-circuit-board contacts
17 Housing
18 Opening
19 Opening
20 Fastening installation
21 Line
22 Branch
23 Insulation body
24 Conducting body
25 External plug-connector contact

The invention claimed is:

1. Electrical connection device for connecting a plug connector to a printed circuit board in a motor vehicle, having the following:
a first number of at least one first electrical connection-device contact for contacting at least one assigned plug-connector contact;
a second number of at least one second electrical connection-device contact for contacting at least one assigned printed-circuit-board contact;
wherein the at least one first connection-device contact and the at least one second connection-device contact are connected to one another, wherein the electrical connection device is configured in such a manner that at least one printed-circuit-board contact is able to be selectively connected to assigned plug-connector contacts which differ in terms of the relative disposal thereof in relation to the printed-circuit-board contact and/or differ in that said plug-connector contacts are a component part of plug connectors which differ from one another in terms of the configuration of the respective plug-connector contacts thereof, wherein the second number comprises at least two second connection-device contacts which are configured in such a manner that the same printed-circuit-board contact is able to be selectively connected to the at least two second connection-device contacts in a first alignment and in at least one further alignment, at least substantially orthogonal to the first alignment, of the connection device in relation to the printed circuit board; and/or
the first number comprises at least two first connection-device contacts which are configured in such a manner that the same plug-connector contact is able to be selectively connected to the at least two first connection-device contacts in a first alignment and in at least one further alignment, at least substantially orthogonal to the first alignment, of the connection device in relation to the plug connector.

2. Electrical connection device according to claim 1, wherein the first number comprises at least two first connection-device contacts which are disposed at different locations of the connection device and are connected, or able to be connected, to the same second connection-device contact; and/or
the second number comprises at least two second connection-device contacts which are disposed at different locations of the connection device and are connected, or able to be connected, to the same first connection-device contact.

3. Electrical connection device according to claim 1, wherein the first number comprises at least two dissimilar contact types which differ in particular in terms of the voltage ranges thereof, in particular a first contact type for a high voltage and a second contact type for a low voltage, and/or in terms of the geometry thereof, and/or the second number comprises at least two dissimilar contact types which differ in terms of the voltage ranges thereof, in particular a first contact type for a high voltage and a second contact type for a low voltage, and/or in terms of the geometry thereof.

4. Electrical connection device according to claim 1, wherein the connection device has at least one insulation body wherein the respective connection-device contacts are preferably attached to the insulation body and/or are embedded in the insulation body.

5. System comprising an electrical connection device according to claim 1, as well as at least one printed circuit board, and/or at least one plug connector, which are/is able to be connected, or is connected, to the connection device, wherein the at least one printed circuit board and the at least one plug connector are in particular able to be connected, or are connected, to one another by way of the connection device.

6. System according to claim 5, wherein at least one plug connector is able to be connected to the connection device at two different locations and/or in at least two different relative alignments in relation to the printed circuit board.

7. System according to claim 5, wherein at least two plug connectors which differ from one another in terms of a disposal and/or a moulding and/or a number of the respective plug connectors thereof are provided.

8. System according to claim 5, wherein at least one plug connector is able to be connected to the connection device in two different relative alignments in relation to the printed circuit board.

9. System according to claim 5, wherein a housing in which the printed circuit board and/or the connection device are/is able to be at least partially received, and/or into which at least one plug-connector contact is able to be introduced is provided.

10. System according to claim 5, wherein the plug connector for connecting at least one external electrical line has at least one external plug-connector contact.

11. Electrical connection method for connecting a high-voltage (HV) pin header to a printed circuit board in a motor vehicle, wherein the plug connector and the printed circuit board are electrically connected to one another by means of a connection device according to claim 1.

12. Electrical connection method according to claim 11, wherein there are two possible relative disposals for the plug connector in relation to the printed circuit board and one of the two possible relative disposals is selected, and/or wherein there are two plug connectors which are able to be connected to the connection device and which are configured so as to be dissimilar in terms of the respective plug-connector contacts thereof, and one of said plug connectors is selected and connected to the connection device.

13. Electrical connection device of claim 1, wherein the plug connector is a pin header.

* * * * *

UNITED STATES PATENT AND TRADEMARK OFFICE
CERTIFICATE OF CORRECTION

| | |
|---|---|
| PATENT NO. | : 11,527,841 B2 |
| APPLICATION NO. | : 17/072552 |
| DATED | : December 13, 2022 |
| INVENTOR(S) | : Harald Bachmann et al. |

It is certified that error appears in the above-identified patent and that said Letters Patent is hereby corrected as shown below:

On the Title Page (54), Line 4, "ELECTICAL" should be --ELECTRICAL--.

In the Specification

Column 1, Line 4, "ELECTICAL" should be --ELECTRICAL--.

Signed and Sealed this
Fourteenth Day of March, 2023

Katherine Kelly Vidal
*Director of the United States Patent and Trademark Office*